United States Patent
Ueyama et al.

(10) Patent No.: US 9,352,395 B2
(45) Date of Patent: May 31, 2016

(54) HEAT-SHRINKABLE MULTI-LAYER FILM FOR DEEP-DRAW FORMING, AND PROCESS FOR PRODUCTION THEREOF

(75) Inventors: Takahisa Ueyama, Tokyo (JP); Tadayoshi Itoh, Tokyo (JP); Yuta Sekiya, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 999 days.

(21) Appl. No.: 13/520,888

(22) PCT Filed: Dec. 17, 2010

(86) PCT No.: PCT/JP2010/073472
§ 371 (c)(1),
(2), (4) Date: Jul. 6, 2012

(87) PCT Pub. No.: WO2011/083707
PCT Pub. Date: Jul. 14, 2011

(65) Prior Publication Data
US 2013/0136906 A1      May 30, 2013

(30) Foreign Application Priority Data

Jan. 8, 2010  (JP) .................................. 2010-003188

(51) Int. Cl.
*B29C 55/16* (2006.01)
*B32B 27/08* (2006.01)
*B32B 27/32* (2006.01)
*B32B 27/34* (2006.01)
*B32B 27/36* (2006.01)
*B23B 27/08* (2006.01)

(52) U.S. Cl.
CPC ................. *B23B 27/08* (2013.01); *B32B 27/32* (2013.01); *B32B 27/34* (2013.01); *B32B 27/36* (2013.01); *B29C 55/16* (2013.01); *B32B 2307/31* (2013.01); *B32B 2307/54* (2013.01); *B32B 2307/736* (2013.01); *Y10T 428/2495* (2015.01)

(58) Field of Classification Search
None
See application file for complete search history.

(56) References Cited

U.S. PATENT DOCUMENTS

| 2002/0061412 | A1 | 5/2002 | Ueyama et al. |
| 2003/0129434 | A1* | 7/2003 | Glawe .................... B32B 27/08 428/515 |
| 2003/0157350 | A1 | 8/2003 | Ueyama et al. |

FOREIGN PATENT DOCUMENTS

| CA | 2 642 503 | 8/2007 |
| EP | 1 985 444 | 10/2008 |
| EP | 2 067 705 | 6/2009 |
| JP | 2003/535733 | 12/2003 |
| WO | 2007/094144 | 8/2007 |

OTHER PUBLICATIONS

International Preliminary Report on Patentability and Written Opinion of the International Searching Authority issued Jul. 10, 2012 in International (PCT) Application No. PCT/JP2010/073472.
Office Action issued Apr. 2, 2013 in corresponding New Zealand Patent Application No. 601038.
International Search Report issued Apr. 6, 2011 in International (PCT) Application No. PCT/JP2010/073472, of which the present application is the national stage.

* cited by examiner

*Primary Examiner* — Ramsey Zacharia
(74) *Attorney, Agent, or Firm* — Birch, Stewart, Kolasch & Birch, LLP

(57) ABSTRACT

A polyamide resin-based heat-shrinkable multilayer film having excellent heat shrinkability and strength, as well as a high degree of deep A polyamide resin-based heat-shrinkable multilayer film having excellent heat shrinkability and strength, as well as a high degree of deep drawability as represented a shorter side-basis draw ratio (D/L) in excess of 0.6 between a maximum draw depth (D) and a shorter side length (L) of a mold opening is provided. The multilayer film is characterized by including a surface layer (a) comprising a thermoplastic resin, an intermediate layer (b) comprising a polyamide resin, and a surface layer (c) comprising a sealable resin, wherein (A) the intermediate layer (b) comprises a mixture of an aliphatic polyamide having a melting point of at least 180° C., and an amorphous aromatic polyamide comprising a polycondensation product of an aliphatic diamine with is ophthalmic acid and terephthalic acid as main acid components, including 25-45 wt. % of the amorphous aromatic polyamide, and has a thickness exceeding 25% and at most 50% of a total thickness of whole layers, and exhibiting: (B) tensile stresses at an elongation of 100% as measured in a tensile test at 100° C., including 3-22 N in at least one of a longitudinal direction (MD) and a transverse direction (TD) and an average of MD and TD values of 3-20N, and (C) a shrinkage in hot water at 90° C. of 3 to 20% in each of MD and TD. The film is produced through a process of strictly controlling biaxial stretching ratios and heat-relaxation ratios.

12 Claims, 1 Drawing Sheet

HEAT-SHRINKABLE MULTI-LAYER FILM FOR DEEP-DRAW FORMING, AND PROCESS FOR PRODUCTION THEREOF

TECHNICAL FIELD

The present invention relates to a heat-shrinkable multi-layer film which includes a polyamide resin layer as a main resin layer and is excellent in deep drawability, and a process for production thereof.

BACKGROUND ART

Conventionally, there has been widely performed a technology of subjecting a heat-shrinkable multilayer film to bag-making into a bag or a pouch with a bag sealer and filling up the bag or pouch with a content, or to automatic packaging of a content directly or on a tray with such a heat-shrinkable multilayer film while concurrently subjecting the film to bag making, for packaging and processing products, inclusive of food, such as uncooked meat, ham, and sausage, and other products. Such a packaging film is required of various properties, and an excellent balance among various properties, inclusive of: heat-shrinkability, strength, heat resistance, high-temperature creep-resistance, formability, adaptability to various packaging modes, gas-barrier property, water vapor barrier-property, and transparency.

As a packaging material satisfying various characteristics as described above and suitably used especially as a heat-shrinkable packing material required of a strength, there has been proposed a heat-shrinkable multilayer film including a polyamide resin layer as a principal resin layer. For example, Patent document 1 shown below has proposed: "a heat-shrinkable multilayer film, comprising: an outer surface layer (a) comprising a thermoplastic resin, a first intermediate layer (b1) comprising a polyamide resin, a second intermediate layer (b2) comprising saponified ethylene-vinyl acetate copolymer, and an inner surface layer (c) comprising a polyolefin resin, wherein the heat-shrinkable multilayer film has a hot-water shrinkability at 90° C. of 3-45% in each of longitudinal and transverse directions, and the above-mentioned polyamide resin is a mixture of 60-90 wt. % of an aliphatic polyamide resin having a melting point of at least 210° C., and 10-40 wt. % of an aromatic polyamide resin comprising isophthalic acid and terephthalic acid as principal acid components.

On the other hand, there is also known a method of forming a base material by deep draw forming (or simply, deep drawing), which base material is capable of allowing automatic packaging more easily in combination with an ordinarily flat lid material instead of a bag-making step into a bag or pouch. As a film for deep draw forming, an unstretched multilayer film is generally known to be excellent in deep drawability but, including that of a polyamide resin-based multilayer film, an unstretched multilayer film provides only a low strength of film after deep drawing, and is thus accompanied with problems such that the film is liable to be broken, the film thickness has to be increased remarkably, and the film shows an insufficient heat-shrinkability or is liable to generate wrinkles after the shaping.

The polyamide resin-based heat-shrinkable multilayer film of the above-mentioned Patent document 1 has excellent heat-shrinkability and strength, shows particularly excellent performances as bag-making packaging materials, such as a bag and a pouch, and also solves the problems of the unstretched multilayer film described above as a multilayer film for deep drawing, but still involves a problem that it is liable to be broken to lose practical applicability to a high degree of deep drawing, especially to such a deep drawing performed by using a deep drawing mold having a rectangular opening with a longer side and a shorter side and requiring a shorter side-basis draw ratio (D/L) exceeding 0.6 as determined by a maximum draw depth (D)/shorter side (L) of the mold, and/or a deep drawing using a mold having a sloped bottom face. For example, such a high degree of deep drawing is required for packaging of a content material, such as sausage, having a large length/width ratio, a wedge-shaped content material, such as a cheese piece, or packaging of a cut product, such as cut salami, ham or sausage, for providing a package of which the commodity value is liable to be impaired if the seal part is disposed on the cut face.

Further, Patent document 2 shown below has proposed "a stretch-oriented multilayer film, comprising: a surface layer (a) comprising a thermoplastic resin, an intermediate layer (b) comprising a polyamide resin, and a surface layer (c) comprising a sealable resin, wherein the multilayer film shows an impact resistance of at least 1.5 Joule at a conversion thickness of 50 μm at −10° C." The multilayer film has taken note of a deep drawability in addition to the low-temperature packaging performance. However, the film of Patent document 2 still fails to satisfy a high degree of deep drawability as represented by a shorter side-basis draw ratio (D/L) exceeding 0.6.

CITATION LIST

Patent Literature

[Patent document 1] WO2007/094144A1.
[Patent document 2] JP-A 2003-535733.

SUMMARY OF INVENTION

In view of the above-mentioned circumstances, a principal object of the present invention is to provide a polyamide resin-based multilayer film showing excellent heat-shrinkability and strength and also adaptability to a high degree of deep draw forming as represented by a shorter side-basis draw ratio (D/L) exceeding 0.6, and also a process for production thereof.

As a result of earnest study with the above-mentioned object, the present inventors have found, in order to provide a polyamide resin-based heat-shrinkable multilayer film with excellent heat-shrinkability and strength as well as a high degree of deep drawability, that it is very important to appropriately control the tensile characteristics, especially a tensile stress at a 100%-elongation, under temperature conditions approximated to deep drawing conditions, and more specifically for that purpose, it is important to use a polyamide resin of a very restrictive composition in the polyamide resin-based intermediate layer governing these properties and strictly control the thickness of the intermediate layer in the total thickness of the whole layers. Moreover, for achievement of the above-mentioned object, it has been also found very preferred to control strictly a biaxial stretching ratio and a heat treatment relaxation rate in the process for production of such a heat-shrinkable multilayer film.

Based on the above findings, the heat-shrinkable multilayer film adapted for deep draw forming, according to the present invention, comprises: a surface layer (a) comprising a thermoplastic resin, an intermediate layer (b) comprising a polyamide resin, and a surface layer (c) comprising a sealable resin, wherein, (A) the intermediate layer (b) comprises a mixture of an aliphatic polyamide having a melting point of at least 180° C., and an amorphous aromatic polyamide comprising a polycondensation product of an aliphatic diamine with isophthalic acid and terephthalic acid as main acid components, including 25-45 wt. % of the amorphous aromatic polyamide, and has a thickness exceeding 25% and at most 50% of a total thickness of whole layers; and the multilayer film exhibits: (B) tensile stresses at an elongation of 100% as measured in a tensile test at 100° C., including 3-22 MPa in at least one of a longitudinal direction (MD) and a transverse direction (TD) and an average of MD and TD values of 3-20 MPa, and (C) a shrinkage in hot water at 90° C. of 3 to 20% in each of MD and TD.

Further, the process for producing a heat-shrinkable multilayer film, according to the present invention, comprises:

co-extruding at least three species of melted thermoplastic resins to form a tubular product comprising at least three layers including a surface layer (a) comprising a thermoplastic resin, an intermediate layer (b) comprising a polyamide resin, and a surface layer (c) comprising a sealable resin; wherein the intermediate layer (b) comprises a mixture of an aliphatic polyamide having a melting point of at least 180° C., and an amorphous aromatic polyamide comprising a polycondensation product of an aliphatic diamine with isophthalic acid and terephthalic acid as main acid components, including 25-45 wt. % of the amorphous aromatic polyamide, and has a thickness exceeding 25% and at most 50% of a total thickness of whole layers;

cooling with water the tubular product to a temperature below a lowest one of the melting points of thermoplastic resins principally forming the respective layers, re-heating the tubular product to a temperature which is at most the lowest one of the melting points of thermoplastic resins principally forming the respective layers, vertically pulling the tubular product while introducing a fluid into the tubular product to stretch the tubular product 2.1-2.4 times in the vertical direction and 2.1-2.6 times in the circumferential direction to form a biaxially stretched tubular film, folding the tubular film, again introducing a fluid into the folded tubular film to form a tubular film, heat-treating the tubular film from its surface layer (a) side with steam or warm water to provide a relaxation ratio of 20-35% in each of the vertical direction and the circumferential direction, and cooling the heat-treated tubular film to obtain a stretch-oriented multilayer film.

DESCRIPTION OF EMBODIMENTS

The heat-shrinkable multilayer film of the present invention comprises at least three layers, including a surface layer (a) comprising a thermoplastic resin, an intermediate layer (b) comprising a polyamide resin, and a surface layer (c) comprising a sealable resin.

As a thermoplastic resin forming the surface layer (a), the thermoplastic resin having an appropriate stretchability in a state of lamination with the intermediate layer (b) comprising a polyamide resin. Preferred examples of the is thermoplastic resin may include: polyolefin resin (PO), polyester resin, and polyamide resin.

Specific examples of the polyolefin resin (PO) may include: LLDPE (linear low-density polyethylene), VLDPE (linear very low-density polyethylene), LDPE (low-density polyethylene) (including those polymerized by using the single site catalyst (metaflocene catalyst) in addition to polyethylene obtained by a conventional-type catalyst (Ziegler Natta catalyst)); polyolefin resins (including copolymers containing a relatively small amount (less than 50 wt. %) of comonomer units), such as polypropylene, propylene-ethylene copolymer, propylene-ethylene-butene-1 copolymer, ethylene-vinyl acetate copolymer, ethylene-acrylic acid copolymer, ethylene methacrylic acid copolymer, and ethylene-ethyl acrylate copolymer.

The polyester resin forming the surface layer (a) may be either an aliphatic polyester resin or an aromatic polyester resin.

The polyester resin may be formed through a usual production process by using a dicarboxylic acid component, examples of which may include: terephthalic acid and isophthalic acid, as mentioned above and, in addition thereto, dimer acids which are dimers of unsaturated fatty acids, adipic acid, oxalic acid, malonic acid, succinic acid, azelaic acid, sebacic acid, phthalic acid, 5-t-butyl-isophthalic acid, naphthalene dicarboxylic acid, diphenyl ether dicarboxylic acid, cyclohexane dicarboxylic acid, etc., and two or more species of these can be used in combination. As a diol component for providing the polyester resin, those capable of providing a polyester resin through a usual production process, and example thereof may include: ethylene glycol, propylene glycol, tetramethylene glycol, neopentyl glycol, hexamethylene glycol, diethylene glycol, polyalkylene glycol, 1,4-cyclohexanedimethanol, 2-alkyl-1,3-propanediol, 1,4-butanediol, etc., and two or more species of these can be used in combination.

Among the above, it is preferred to use an aromatic polyester resin comprising an aromatic dicarboxylic acid component, and particularly preferably, a polyester between terephthalic acid as a dicarboxylic acid component and a diol having at most ten carbon atoms, such as polyethylene terephthalate, and polybutylene terephthalate. It is also preferred to use a polyester copolymer obtained by replacing a portion, preferably up to 30 mol. %, more preferably up to 15 wt. %, of the terephthalic acid with another dicarboxylic acid, e.g., isophthalic acid, or a polyester copolymer resin obtained by replacing a portion of the diol component, e.g., ethylene glycol, with another diol, such as 1,4-cyclohexanedimethanol (e.g., "Kodapak PET#9921", made by Eastman Kodak Co.). It is also possible to use different species of polyester resins in mixture.

The polyester resin may preferably have a limiting viscosity number of about 0.6 to 1.2. The outer surface layer can contain up to 20 wt. % of a thermoplastic resin other than polyester resin, such as a thermoplastic elastomer represented by thermoplastic polyurethane or a polyolefin resin modified with an acid, such as maleic acid, or an anhydride thereof.

The polyamide resin forming the surface layer (a) may comprise an ordinary aliphatic polyamide unless it obstructs the film formation at a low stretching ratio as described hereinafter. It is however preferred to use an aliphatic polyamide polymer or copolymer having a melting point of 180° C. or higher, preferred examples of which may include: nylon 6, nylon 66, nylon 610, nylon 612, nylon 6-66, nylon 6-610, nylon 66-610, and nylon 6-12. These aliphatic polyamides may be used singly or in mixture of two or more species, and can also be used as a mixture with an amorphous aromatic polyamide as used in the below-mentioned intermediate layer (b). In the case where a mixture of an aliphatic polyamide and an amorphous aromatic polyamide is use as a polyamide resin forming the surface layer (a), it is preferred to use a mixture containing 10-45 wt. %, particularly 15-30 wt. %, of the amorphous aromatic polyamide. Among the above, it is particularly preferred to use nylon 6-66 alone, a mixture of nylon 6 and an amorphous aromatic polyamide, or a mixture of nylon 6-66 and an amorphous aromatic polyamide, in view of easy extrusion processing and no obstruction of the film formation.

The surface layer (a) comprising a thermoplastic resin may preferably have a thickness, which is smaller than, particularly at most 6% and less than 50% of, the thickness of the intermediate layer (b), so as not to impair the excellent stretchability and mechanical properties of the intermediate layer (b) comprising a polyamide resin described below.

The polyamide resin used for forming the intermediate layer (b), comprises a mixture of an aliphatic polyamide having a melting point of at least 180° C. and an amorphous aromatic polyamide, and contains the amorphous aromatic polyamide at 25-45 wt. %.

If nylon 12, nylon 6-12, nylon 6-69, etc., for example, having a melting point below 180° C. is used as the aliphatic polyamide, it becomes impossible to carry out film formation at a low stretching ratio according to a below-mentioned production process, and an improvement in deep drawability cannot be obtained either. The upper limit of the melting point is not strict as far as melt forming is not obstructed thereby, but an aliphatic polyamide having a melting point of at most 270° C. may preferably be used in general. Specific examples of the aliphatic polyamide having such characteristics may include: aliphatic polyamide polymers, such as nylon 6, nylon 66, nylon 610 and nylon 612, and aliphatic polyamide copolymers, such as nylon 6-66, nylon 6-610, nylon 66-610 and nylon 6-12. Among the above, nylon 6 (melting point: about 225° C.) and nylon 6-66 (melting point: about 180-200° C.) may preferably be used because of ease of extrusion and relative inexpensiveness.

The amorphous aromatic polyamide forming the intermediate layer (b) together with the above-mentioned aliphatic polyamide, is a polycondensation product of an aliphatic diamine with isophthalic acid and terephthalic acid as principal acid components. The acid components may preferably comprise a mixture of 40-98 mol % of isophthalic acid and 2-60 mol % of terephthalic acid, and can also contain another acid component, such as adipic acid, as needed within a limit of retaining the above-mentioned amount ranges of the isophthalic acid and terephthalic acid. The aliphatic diamine may preferably comprise hexamethylene diamine alone or in mixture with a minor amount of bis(p-aminocyclohexylmethane). In view of broad utility, it is particularly preferred to use an amorphous nylon copolymer obtained by using hexamethylenediamine as a sole aliphatic diamine component and commonly called "nylon 6I-6T" (Ny 6I-6T). These amorphous aromatic polyamides generally have a glass transition point (Tg) of about 0.90-135° C. Examples of commercially available products thereof may include: "GRIVORY G21" (Tg=125° C.) made by EMS Co., and "SELAR PA3426" (Tg=127° C.) made by DuPont Co.

The amorphous aromatic polyamide content in the polyamide resin forming the intermediate layer (b) needs to be 25-45 wt. %, and is preferably 30-40 wt. %. Below 25 wt. %, the stretching film formation characteristic of the multilayer becomes poor to result in a product multilayer film with excessive thickness unevenness, also poor roll appearance, and thus scarce commodity value. On the other hand, even if it exceeds 45 wt. %, the stretching film formability becomes also poor, to result in a possibility of film breakage during the stretching film formation.

The layer thickness of the intermediate layer (b) is required to occupy at least 25% and at most 50% of the total thickness of the multilayer film of the present invention, more preferably 30 to 40%, still more preferably 28 to 45%. At a thickness ratio of below 25%, there results in an excessive thickness unevenness at the time of stretching, so that the commodity value of the product multilayer film becomes scarce, and also it becomes difficult to acquire a high degree of deep drawability aimed at by the present invention. When the thickness proportion of the intermediate layer (b) is excessive, the stretching may become difficult, or the flexibility of the product film may be impaired. The intermediate layer (b) can also contain up to about 20 wt. % of a thermoplastic resin other than polyamide resin, such as an olefin resin modified with an acid, such as maleic acid, or an anhydride thereof, ethylene-acrylic acid copolymer, ethylene-methacrylic acid copolymer, ionomer resin, or saponified ethylene-vinyl acetate copolymer, within an extent of retaining the above-mentioned content range of the amorphous aromatic polyamide.

The sealable resin forming the surface layer (c) may be selected from thermoplastic resins, inclusive of: polyolefins polymerized by using the single site catalyst or metallocene catalyst (hereinafter possibly abbreviated as "SSC"), such as linear low density polyethylene (abbreviated as "SSC-LLDPE"), linear very low-density polyethylene (abbreviated as "SSC-VLDPE"); conventional ethylene-α-olefin copolymers (generally called "LLDPE", "VLDPE", etc.) ethylene-vinyl acetate copolymer (abbreviated as "EVA"), ethylene-methacrylic acid copolymer (abbreviated as "EMAA"), ethylene-methacrylic acid-unsaturated aliphatic carboxylic acid copolymer, low-density polyethylene, ionomer (abbreviated as "IO") resin, ethylene-acrylic acid copolymer, ethylene-methyl acrylate copolymer (abbreviated as "EMA"), ethylene-ethyl acrylate copolymer (abbreviated as "EEA"), ethylene-butyl acrylate copolymer (abbreviated as "EBA"), etc. These preferred species of sealable resins can be inclusively called ethylene copolymers, especially copolymers comprising ethylene as a principal component (more specifically, more than 50 wt. %) and a vinyl monomer copolymerizable with ethylene as a component of a smaller amount (more specifically below 50 wt. %, preferably 30 wt. % or less). Preferred examples of the vinyl monomer may include: α-olefins having 3-8 carbon atoms, unsaturated carboxylic acids having at most 8 carbon atoms and esters thereof, such as acrylic acid, methacrylic acid, acrylic acid esters, methacrylic acid esters, and vinyl acetate. It is also preferred to use an acid-modified ethylene copolymer obtainable by modifying such an ethylene copolymer with at most 3 wt. % of an unsaturated carboxylic acid. In addition to the above, it is also possible to use a thermoplastic resin, such as polypropylene resin, polyester resin, or an aliphatic nylon. The sealable resin may preferably have a melting point of at most 150° C., particularly 135° C. or less. The sealable resin can also be a blend material which contains at least one species of the above-mentioned resins within an extent of not adversely affecting the transparency of the product film.

Among the above, preferred examples of such sealable resins forming the inner surface layer (c) may include: SSC-LLDPE, SSC-VLDPE, LLDPE, VLDPE, EVA, EMAA, ethylene-methacrylic acid-unsaturated aliphatic carboxylic-acid copolymer, and IO resins. A particularly preferred class of SSC-type polyolefins may include those obtained by using a constrained geometry catalyst (a type of metallocene-catalyst developed by Dow Chemical Company). The constrained geometry catalyst may provide ethylene-α-olefin copolymers which may be classified as a substantially linear polyethylene resin having about 0.01-about 3, preferably about 0.01-about 1, more preferably about 0.05-about 1, long-chain branching(s) per 1000 carbon atoms. Because of long-chain branches each having about 6 or more carbon atoms selectively introduced into its molecular structure, the ethylene-α-olefin copolymer may be provided with excellent physical properties and good formability or processability, and an example thereof is commercially available from Dow Chemical Company under a trade name of "AFFINITY" or "ELITE" (including 1-octene as α-olefin). Other examples of polyethylene resins obtained by using a metallocene catalyst may include those available under trade names of "EXACT" (EXXON Co.), "UMERIT" (Ube Kosan K.K.), "EVOLUE" (Mitsui Kagaku K.K.), "COLONEL" (Nippon Polychem K.K.) and "HARMOLEX" (Nippon Polyolefin K.K.). Such a metallocene-catalyzed polyolefin (SSC-polyolefin) may preferably have a polydispersity index defined as a ratio (Mw/Mn) between a weight-average molecular weight (Mw) and a number-average molecular weight (Mn) of below 3, more preferably 1.9-2.2. The surface layer (c) comprising a sealable resin may preferably have a heat resistance which is lower than that of the surface layer (a). This is because, if the surface layer (c) comprising a sealable resin has a higher heat resistance than the surface layer (a), at the time of applying heat to the film for sealing or deep drawing, the surface layer (a) is liable to be melted in contact with a heating plate to result in a problem regarding the adaptability to sealing or packaging machines or deep drawing processability.

The surface layer (c) comprising a sealable resin can be provided with easy peelability, e.g., in the case of deep draw packaging. This can be accomplished by using, e.g., a mixture of EMAA and a polypropylene resin, or a mixture of EVA and polypropylene resin.

The heat-shrinkable multilayer film according to the present invention includes the above-mentioned surface layer (a) comprising a thermoplastic resin, intermediate layer (b) comprising a polyamide resin, and surface layer (c) comprising a sealable resin, as its indispensable component layers, but can also include an additional intermediate layer other than the intermediate layer (b) comprising a polyamide resin for the purpose of, e.g., providing the product multilayer film with improved functionality or processability. Examples of such an optional intermediate layer may include the following.

A gas barrier intermediate layer (d), particularly an oxygen gas-barrier layer, comprising a gas barrier resin, examples of which may include: EVOH, and aromatic polyamides including an aromatic diamine unit, such as polymetaxylilene adipamide (nylon MXD6).

Preferred examples of resins forming still another intermediate layer may include similar resins as the above-mentioned sealable resins forming the surface layer (c).

One or more adhesive resin layers may be inserted as an optional intermediate layer, as desired, e.g., in case where a sufficient adhesion is not ensured between the above-mentioned respective layers. Such an adhesive resin can be selected from those forming the above-mentioned optional intermediate layers. Further preferred examples of the adhesive resin used for the above purpose may include: EVA, EEA, EAA, acid-modified polyolefins (inclusive of reaction products of olefin homo- or co-polymers with unsaturated carboxylic acids, such as maleic acid and fumaric acid, acid anhydrides, esters or metal salts of these acids, such as acid-modified VLDPE, acid modified LLDPE and acid-modified EVA). It is particularly suitable to use a polyolefin resin modified with an acid, such as maleic acid, or an anhydride thereof.

Into any one or more of the above-mentioned layers, it is possible to add an additive, such as a lubricant or an antistatic agent.

Examples of the lubricant may include: hydrocarbon lubricants, fatty acid lubricants, fatty acid amide lubricants, ester lubricants and metallic soaps. The lubricants may be liquid or solid. Specific examples of the hydrocarbon lubricants may include: liquid paraffin, natural paraffin, polyethylene wax and micro-crystalline wax. Fatty acid lubricants may include stearic acid and lauric acid. Fatty acid amide lubricants may include: stearic acid amide, palmitic acid amide, N-oleyl-palmitic acid amide, behenic acid amide, erucic acid amide, arachidic acid amide, oleic acid amide, methylene-bis-stearoyl amide, and ethylene-bis-stearoyl amide. Ester lubricants may include butyl stearate, hardened castor oil, ethylene glycol mono-stearate, and stearic acid mono-glyceride. Metallic soaps may be derived from fatty acids having 12-30 carbon atoms and may include zinc stearate and calcium stearate as representative examples. Among these, fatty acid amide lubricants and metallic soaps may be preferred because of good compatibility with a thermoplastic resin, particularly a polyolefin resin. Specifically preferred examples of lubricants may include behenic acid amide, oleic acid amide and erucic acid amide. These lubricants may preferably be added in the form of a master batch. Such a master batch containing, e.g., 5-20 wt. % of a lubricant, may preferably be added in an amount sufficient to provide a concentration of 0.05-2 wt. %, of the lubricant in a resin layer concerned.

The antistatic agent may preferably be a surfactant, which may be any of anionic surfactants, cationic surfactants, non-ionic surfactants, amphoteric surfactants and mixtures of these. The anti-static agent may preferably be added in a proportion of 0.05-2 wt. %, more preferably 0.1-1 wt. %, of a resin layer to which it is added.

As an anti blocking agent to be added into a resin to suppress mutual sticking of the product film (layers), it is possible to add a known inorganic filler for resins, such as talc, diatomaceous earth, silica, zeolite, calcium carbonate, or aluminosilicate. The filler may preferably have a spherical shape. It is preferred to care about a difference in refractive index from the resin to which the filler is added, so as to avoid a lowering in transparency due to a large difference in refractive index. For example, silica, aluminosilicate, zeolite, etc., are preferably used from viewpoints of a refractive index and dispersibility. The anti-blocking agent may preferably have an average particle diameter as measured by the Coulter counter method measurement of 0.5-10 μm, more preferably 1-7 μm. It is further preferred to use an anti blocking agent having an average particle size in the above-mentioned range, after cutting off a portion having particle sizes exceeding 10 μm. There is a possibility that the product film may have a lower transparency or a lower strength in case where the average particle size is excessively large. An excessively small average particle size is liable to result in an insufficient anti-blocking effect (slippability-improving effect) or poor dispersibility. The anti-blocking agent may preferably be added in an amount of 0.05-2 wt. %, particularly 0.1-1 wt. %.

Preferred examples of layer structure of the heat-shrinkable multilayer film according to the present invention are shown below. These are however not exhaustive.

(1) polyester resin/adhesive resin/polyamide resin/adhesive resin/sealable resin,
(2) polyester resin/adhesive resin/polyamide resin/gas-barrier resin/adhesive resin/sealable resin,
(3) polyester resin/adhesive resin/polyamide resin/adhesive resin/gas-barrier resin/adhesive resin/sealable resin,
(4) polyester resin/adhesive resin/polyamide resin/adhesive resin/gas-barrier resin/adhesive resin/polyamide resin/adhesive resin/sealable resin,
(5) polyester resin/adhesive resin/polyamide resin/gas-barrier resin/polyamide resin/adhesive resin/sealable resin,
(6) polyolefin resin/adhesive resin/polyamide resin/adhesive resin/sealable resin,
(7) polyolefin resin/adhesive resin/polyamide resin/gas-barrier resin/adhesive resin/sealable resin,
(8) polyolefin resin/adhesive resin/polyamide resin/adhesive resin/gas-barrier resin/adhesive resin/sealable resin,
(9) polyolefin resin/adhesive resin/polyamide resin/adhesive resin/gas-barrier resin/adhesive resin/polyamide resin/adhesive resin/sealable resin,
(10) polyolefin resin/adhesive resin/polyamide resin/gas-barrier resin/polyamide resin/adhesive resin/sealable resin,
(11) polyamide resin/adhesive resin/polyamide resin/adhesive resin/sealable resin,
(12) polyamide resin/adhesive resin/polyamide resin/gas-barrier resin/adhesive resin/sealable resin,
(13) polyamide resin/adhesive resin/polyamide resin/adhesive resin/gas-barrier resin/adhesive resin/sealable resin,
(14) polyamide resin/adhesive resin/polyamide resin/adhesive resin/gas-barrier resin/adhesive resin/polyamide resin/adhesive resin/sealable resin,
(15) polyamide resin/adhesive resin/polyamide resin/gas-barrier resin/polyamide resin/adhesive resin/sealable resin.

The heat-shrinkable multilayer film of the present invention may preferably be formed by subjecting the above-mentioned respective resins to lamination, stretching and relaxation into a final form of a multilayer film having a total thickness in the range of 40-250 µm, particularly 60-200 µm.

More specifically, it is preferred that the surface layer (a) comprising a thermoplastic resin has a thickness of 0.5-25 µm, particularly 1-15 µm; the intermediate layer (b) comprising a polyamide resin has a thickness of 10-100 µm, particularly 20-80 µm within an extent of retaining the above-mentioned thickness proportion with respect to the total thickness; and the surface layer (c) comprising a sealable resin has a thickness of 15-150 µm, particularly 20-100 µm.

The optionally disposed gas barrier layer (d) may have a thickness of, e.g., 1-30 µm, preferably 2-15 µm. Below 1 µm, the oxygen gas barrier-improving effect may be scarce, and above 30 µm, the extrusion of the layer and the stretching and processing of the multilayer film become difficult.

The adhesive resin layer can be disposed in a to plurality of layers, each having a thickness in the range of suitably 0.5-5 µm.

The heat-shrinkable multilayer film for deep draw forming of the present invention can be formed by first forming a yet-unstretched film by co-extrusion through a plurality of extruders and then biaxially stretching the film at ratios of 2.1-2.4 times in a longitudinal direction and 2.1-2.6 times in a transverse direction by a known process, such as the tenter process, followed by a high degree of relaxation heat treatment at a relaxation ratio of 20-35% in each of the longitudinal/transverse directions.

The heat-shrinkable multilayer film may preferably be formed through inflation according to the process of the present invention. A preferred embodiment thereof is described with reference to FIG. 1 (sole FIGURE) in the drawing.

Figure 1:
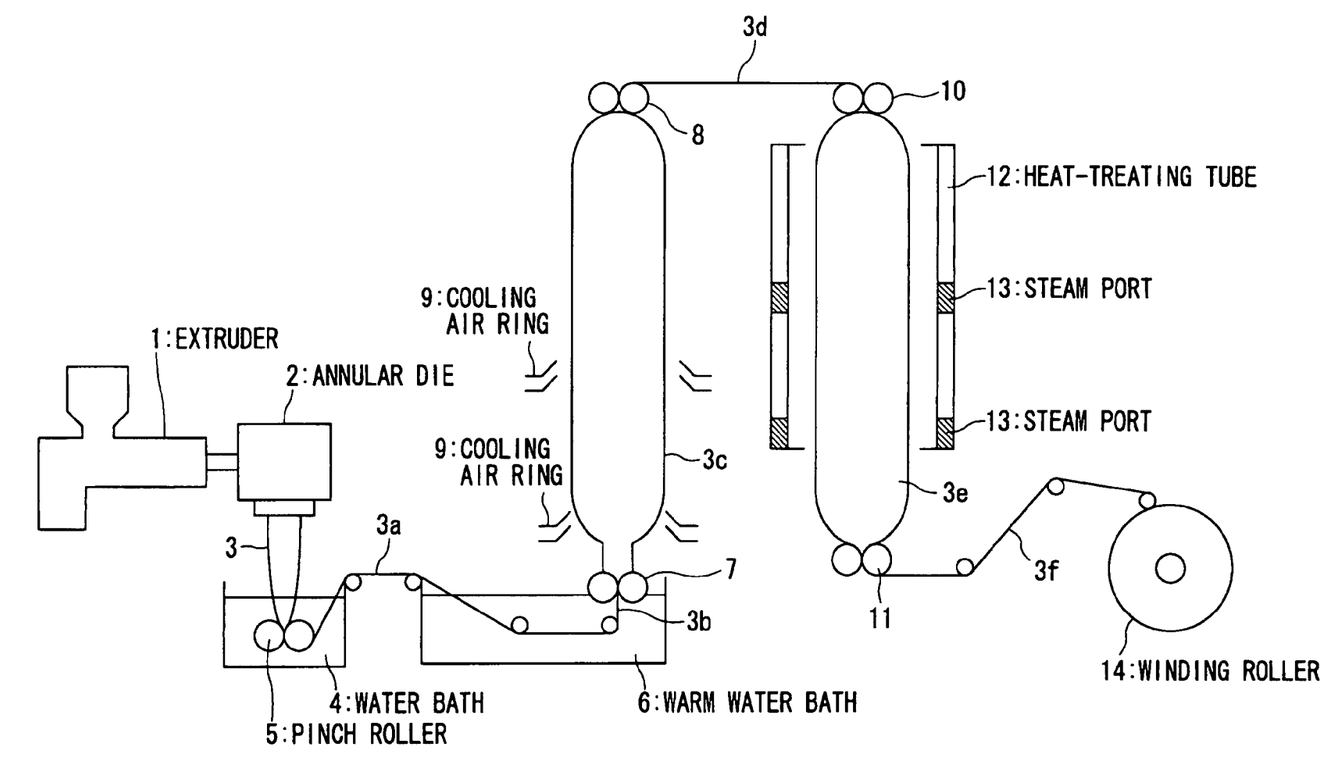
FIG. 1 is a schematic illustration of an apparatus system suitable for practicing an embodiment of the process producing the polyamide resin-based heat-shrinkable multilayer film of the present invention.

A number of extruders 1 (only one being shown) are provided corresponding to the number of laminated resin species, and the respective resins from the extruders are co-extruded through an annular die 2 to form a tubular product (parison) 3 including at least three layers of an outer surface layer (a) comprising a thermoplastic resin, an intermediate layer (b) comprising a polyamide resin and an inner surface layer (c) comprising a sealable resin. The parison 3 is then vertically pulled down into a water bath 4 and taken up by pinch rollers 5 while being cooled down to a temperature that is below the lowest one of the melting points of the principal resins constituting the respective resin layers (i.e., the thermoplastic resin, the polyamide resin and the sealable resin), preferably to 40° C. or below. The thus-taken-up tubular film 3a, while optionally introducing an opening aid such as soybean oil thereinto as desired, is introduced into a bath 6 of hot water at, e.g., 80-95° C., which is at most the lowest one of the meting points of the principal resins constituting the respective layers, and the thus-warmed tubular film 3b is pulled upwards to form a bubble of tubular film 3c with fluid air introduced between pairs of pinch rollers 7 and 8, whereby the tubular film 3c is biaxially stretched simultaneously at ratios which are relatively small and restricted specifically, that is, 2.1-2.4 times, preferably 2.2-2.4 times, in MD and 2.1-2.6 times, preferably 2.2-2.6 times, in TD, while cooling the film 3c with cool air at 10-30° C. from a cooling air ring 9. The thus biaxially stretched film 3d is once folded or laid flat and then pulled downwards to again form a bubble of tubular film 3e with fluid air introduced between pairs of pinch rollers 10 and 11. The bubble of tubular film 3e is held within a heat-treating tube 12 wherein steam from blowing ports 13 is blown (or warm water from spraying ports is sprayed) against the tubular film 3e to heat-treat the tubular film 3e after the biaxial stretching at 70-98° C., preferably 75-95° C., for 1-20 sec., preferably 1.5-10 sec., thereby allowing the tubular film to relax (shrink) by 20-35%, preferably 20-30%, more preferably 20-25%, in each of the machine direction (MD) and the transverse direction (TD). A tubular film 3f after the heat-treatment corresponds to a heat-shrinkable multilayer film according to the present invention and is wound about a winding roller 14.

In order to provide a high-degree of deep drawability while retaining excellent heat-shrinkability and strengths, it is extremely preferred, after the above-specified degree of stretching, to heat-treat the stretched film with steam or warm water having a large heat capacity at a low temperature of 70-98° C., preferably 75-95° C., most preferably 80-95° C. so as to cause the above-specified relaxation (shrink) percentage. At a lower stretch ratio, it is impossible to achieve necessary strength and heat-shrinkability of the film and also results in a large thickness irregularity, so that it becomes difficult to attain a satisfactory packaging performance. On the other hand, at a higher stretch ratio, it becomes difficult to provide a high degree of deep drawability aimed at by the present invention. Moreover, in the case of adopting a medium of a smaller heat capacity, such as heated air or a lower heat-treating temperature of below 70° C., it becomes difficult to realize a sufficiently large degree of relaxation, thus being liable to fail in realizing a high degree of deep drawability. On the contrary, if the heat treatment is effected at a higher temperature exceeding 100° C., the sealable resin layer (c) comprising, e.g., a polyolefin, is liable to be melted, whereby the orientation of the layer (c) is removed, thus being liable to fail in providing excellent strength. If-the relaxation percentage is below 20% at the time of the heat treatment, it is difficult to realize a high degree of deep drawability. Above 35%, it becomes difficult to realize a necessary heat-shrinkability.

In the above-described heat-shrinkable multilayer film production process according to the present invention, the multilayer film before or after the stretching may be exposed to radiation. By the exposure to radiation, the product multilayer film may be provided with improved heat resistance and mechanical strength. Because of a moderate crosslinking effect thereof, the exposure to radiation can exhibit an effect of providing improved film formability by stretching and improved heat resistance. In the present invention, known radiation, such as α-rays, β-rays, electron beams, γ-rays, or X rays may be used. In order to provide an adequate level of crosslinking effect, electron beams and γ-rays are preferred, and electron beams are particularly preferred in view of facility of handling and high processing capacity in producing the objective multilayer film.

The conditions for the above exposure to radiation may be appropriately set depending on the purpose thereof, such as a required level of crosslinkage. For example, it is preferred to effect the electron beam exposure at an acceleration voltage in the range of 150-500 kilo-volts to provide an absorbed dose of 10-200 kGy (kilo-gray) or effect γ-ray exposure at a dose rate of 0.05-3 kGy/hour to provide an absorbed dose of 10-200 kGy.

It is also possible that the inner surface or/and the outer surface of the stretch-oriented multilayer film of the present invention are subjected to corona discharge treatment, plasma treatment or flame treatment.

The heat-shrinkable multilayer film for deep drawing of the present invention manufactured as mentioned above, exhibits characteristic tensile and heat-shrinkage characteristics, inclusive of: tensile stresses at an elongation of 100% as measured in a tensile test at 100° C., including 3-22 MPa, preferably 5-20 MPa, further preferably 5-18 MPa, in at least one of a longitudinal direction (MD) and a transverse direction (TD), and an average of MD and TD values of 3-20 MPa; and a shrinkage in hot water at 90° C. of 3 to 20%, preferably 5-15%, in each of MD and TD. If the above-mentioned stresses in MD and TD are excessively large, an inferior deep-drawability results, and at excessively small stresses, the film after the deep drawing is liable to have an insufficient strength.

The high-degree of deep drawability of the heat-shrinkable multilayer film of the present invention may be characterized through a test wherein a sample film is subjected to deep draw forming using several molds having a specified rectangular opening shape of 155 mm (longer side)×125 mm (shorter side) and variable depths, and represented by a maximum draw depth (D; a depth from a level of the opening to the bottom of a deepest mold) allowing the deep drawing indicated by a film breakage rate not exceeding 5% of at least 60 mm, preferably at least 80 mm, further preferably 90 mm or larger, and a shorter side-basis draw ratio (D/L) determined as a ratio between the maximum draw depth (D) and a shorter side length (L) of the mold of at least 0.70, preferably at least 0.75, further preferably 0.80 or above, and further by a maximum (area-basis) draw ratio as determined by a ratio between an inner surface area of a deepest mold allowing the deep drawing and an opening area of the mold of at least 2.8, preferably at least 3.0, more preferably 3.2 or above.

EXAMPLES

Hereinbelow, the present invention will be described more specifically based on Examples and Comparative Examples. It should be noted however that the scope of the present invention is not restricted by such Examples. Some physical properties described herein are based on values measured according to the following methods.

1. Hot-Water Shrinkability

A sample film on which marks were indicated at a distance therebetween of 10 cm in each of a machine direction (MD) and a transverse direction (TD) perpendicular to the machine direction, was dipped for 10 sec. in hot water adjusted at 90° C. and then taken out therefrom, followed by immediate quenching within water at room temperature. Thereafter, the distance between the marks was measured and a decrease in distance was indicated in percentage of the original distance 10 cm. Five sample films (n=5) from each product film were subjected to the above measurement, and the average value of percentage decrease was indicated in each of the MD and TD.

2. Deep Drawability

A product tubular film was slit into a 425-mm width, and deep drawability was evaluated by a deep drawing test using a deep-draw vacuum packaging machine ("R250", made by Multivac GmbH) and molds having a rectangular opening shape of 155 mm (longer side)×125 mm (shorter side) together with an insert forming a semicircular bottom corner of 30 mm-radius, and deep draw forming was performed under conditions of a forming temperature of 110° C., a heating time of 1.5 sec., a forming time of 2.0 sec. and an air-pressure application time of 0.4 sec. The drawing test was repeated while successively increasing the mold depth from 60 mm by an increment of 5 mm to measure a maximum draw depth (D) allowing a film breakage rate of not more than 5% (as a result of using 20 samples (n=20)).

As other measures of deep drawability, a "maximum (area-basis) draw ratio" and a "shorter side-basis draw ratio (D/L)" are used. The "maximum (area-basis) draw ratio" and the "shorter side-basis draw ratio (D/L)" respectively represent a better deep drawability, when they have larger values.

The deep drawability was also evaluated based on appearance of the film samples after deep drawing according to the following standard:
A: The film after the deep drawing fitted the mold and exhibited a good transparency,
B: The film after the deep drawing fitted the mold, but exhibited slight whitening at the corner.
C: The sample film caused breakage during the draw molding already at the minimum draw depth of 60 mm.

3. High-Temperature Tensile Properties

A product multilayer film was cut along the longitudinal direction (MD) and transverse direction (TD), to provide sample film strips of 10 mm each in width, and each sample film strip was set at a gap between clamps of 50 mm on a universal tensile tester ("Tensilon®-100", made by K.K. Orientec), followed by contact of a heating block heated to 100° C. for 2 sec. onto the sample film, and release of the heating block. Immediately thereafter, a tensile test was started at a crosshead speed of 500 mm/min. to measure a tensile stress at an elongation of 100% for evaluation of a high-temperature tensile characteristic. The test was performed 5 times (n=5) for one sample in an environment of 23° C. and 50% RH. An average tensile stress at 100% elongation was measured in each of the longitudinal and transverse directions.

4. Heat-Shrinkability after Deep Drawing

The heat-shrinkability of a drawn film formed by drawing at its maximum draw depth was evaluated according to the following manner.

A bottom film was prepared by using a deep-draw vacuum packaging machine ("R250", made by Multivac GmbH) and a mold having a rectangular opening shape of 155 mm (longer side)×125 mm (shorter side) and the maximum depth together with an insert forming a semicircular bottom corner of 30 mm-radius, under conditions of a forming temperature of 110° C., a heating time of 1.5 sec., a forming time of 2.0 sec. and an air-pressure application time of 0.4 sec. The thus-formed bottom film and a top film (a film formed by Comparative Example 2 described hereinafter) were subjected to vacuum forming and sealing to form a deep-drawn package product.

The heat-shrinkability of the bottom part of the film formed by deep drawing was evaluated according to the following standard:

A: The film exhibited a hot-water shrinkability at 90° C. of at least 25% both in a longitudinal direction and a transverse direction, thus showing a practically sufficient heat-shrinkability.

5. Film Formability by Stretching

Stretch film-formability of films obtained in Examples and Comparative Examples was evaluated according to the following standard. Incidentally, a thickness fluctuation (%) was calculated as: [(maximum thickness of maximum thickness−minimum thickness of a film)/(average thickness of the film)]×100.

A: The film after winding-up exhibited a thickness fluctuation of 35% or less, thus showing a good productivity, B: The film after winding-up exhibited a large thickness fluctuation of 40% or more leading to a large fluctuation in deep drawability and showing insufficient mechanical properties, thus being practically inapplicable.

C: Failed to provide a film by stretching.

FILM PRODUCTION EXAMPLES

Next, some examples of production of heat-shrinkable multilayer film according to Examples and Comparative Examples are set forth below. Resins (denoted by their abbreviations) used in Examples described herein are summarized below together with their contents, trade names and manufactures.

[Used Resins]

Ny-1: nylon 6; "ULTRAMID B40L", made by BASF A.G.; d (density)=1.13 g/cm$^3$, melting point=220° C., relative viscosity (in 96% $H_2SO_4$)=4.0, Ny-2: nylon 6I-6T copolymer; "GRIVORY G21", made by EMS GmbH; Tg (glass transition point)=125° C., MI=25 cc/10 min. (at 275° C., 5 kg), d=1.18 g/cm$^3$, Ny-3: nylon 6-66 copolymer; "UBE Nylon 5034B", made by Ube Industries, Ltd.; d=1.14 g/cm$^3$, melting point=192° C., relative viscosity (in 98% $H_2SO_4$)=4.4, PET: ethylene terephthalate-ethylene isophthalate copolymer (comprising 12 mol % of isophthalate acid and 88 mol % of terephthalate); "BELLPET IFG-8L", made by Bell to Polyester Products, Inc.

EVOH: saponified ethylene-vinyl acetate copolymer (ethylene content=48 mol. %); "EVAL EPG156B", made by Kuraray K.K.; melt flow rate (MFR)=6.5 g/10 min.

VLDPE: ethylene-hexene-1 copolymer, d=0.908 g/cm$^3$; "Attane 4404G", made by Dow Chemical co.

LLDPE: ethylene-octene copolymer, d=0.916 g/cm$^3$; "MORETEC 0238CN", made by Idemitsu Sekiyu Kagaku K.K.; MFR=2.0 g/10 min.

mod-VL: adhesive polyethylene (very low-density polyethylene modified with an unsaturated carboxylic acid); "ADMER SF730", made by Mitsui Kagaku K.K.; MFR=2.7 g/10 min.

Example 1

By using an apparatus having an arrangement as roughly shown in FIG. 1, a tubular laminate product (parison) having a laminar structure from the outer to the inner layers of PET (3)/mod-VL(3)/Ny-1+Ny-2=60+40 wt. %-mixture (30)/EVOH(7)/mod-VL(3)/VLDPE (44) with thickness ratios of respective layers indicated in the parentheses was co-extruded by extruding the respective resins through a plurality of extruders 1 (only one being shown) respectively and introducing the melted resins to an annular die 2 to melt-bond the respective layers in the above-described order. The molten parison 3 extruded out of the die 2 was quenched to about 25° C. by a water bath 4 to form a flat tubular product 3a. Then, the flat tubular product 3a was passed through a warm water bath 6 at 86° C. and formed into a bubble-shaped tubular film 3c, which was then biaxially stretched at ratios of 2.2 times in a longitudinal direction (MD) and 2.4 times in a transverse direction (TD) by the inflation process while being cooled with cooling air at 20-25° C. from an air ring 9. Then, the biaxially stretched film 3d was guided into a 3 meter-long heat-treating tube 12 to form a bubble-shaped tubular film 3e, which was then heat-treated for about 7 sec. with steam at 85° C. blown out of steam blowing ports 13, while being allowed to relax (shrink) by 25% in MD direction and by 25% in TD direction, thereby providing a biaxially stretched film (heat-shrinkable multilayer film) 3f. The thus-obtained multilayer film exhibited a lay-flat width of 450 mm and a thickness of 90 μm.

The laminate structure, film production (stretching-relaxation) conditions, physical properties and deep drawing performances of the thus-obtained multilayer film are inclusively shown in Tables 1 and 2 together with those of multilayer films obtained in other Examples and Comparative Examples.

Example 2

A biaxially stretched film was prepared in the same manner as in Example 1 except that the mixing ratio of Ny-1+Ny-2 mixture of Example 1 was changed to a Ny-1+Ny-2=65 4-35 wt. % mixture. The thus-obtained biaxially stretched film showed a lay-flat width of 450 mm and a thickness of 90 μm.

Example 3

A biaxially stretched film was prepared in the same manner as in Example 1 except that the mixing ratio of Ny-1+Ny-2 mixture of Example 1 was changed to a Ny-1+Ny-2=70+30 wt. % mixture. The thus-obtained biaxially stretched film showed a lay-flat width of 450 mm and a thickness of 90 μm.

Example 4

A biaxially stretched film was prepared in the same manner as in Example 1 except that the laminar structure in Example 1 was changed to a laminar structure from the outer to the inner layers of PET(6)/mod-VL(3)/Ny-1+Ny-2=60+40 wt. %-mixture (39)/EVOH(7)/mod-VL(3)/VLDPE (72) with thickness ratios of respective layers indicated in the parentheses, and the stretching temperature was changed to 88° C. The thus-obtained biaxially stretched film showed a lay-flat width of 450 mm and a thickness of 130 μm.

Example 5

A biaxially stretched film was prepared in the same manner as in Example 4 except that the laminar structure in Example 4 was changed to a laminar structure from the outer to the inner layers of PET(7)/mod-VL(4)/Ny-1+Ny-2=60+40 wt. %-mixture (48)/EVOH(9)/mod-VL(4)/VLDPE (88) with thickness ratios of respective layers indicated in the parentheses. The thus-obtained biaxially stretched film showed a lay-flat width of 450 mm and a thickness of 160 μm.

Example 6

A biaxially stretched film was prepared in the same manner as in Example 5 except that VLDPE in Example 1 was changed to LLDPE, and the stretching temperature was changed to 90° C. The thus-obtained biaxially stretched film showed a lay-flat width of 450 mm and a thickness of 160 μm.

Example 7

A biaxially stretched film was prepared in the same manner as in Example 1 except that the lay-flat width of the flat tubular product 3a in Example 1 was changed to 231 mm, and the stretching ratios were changed to 2.4 in MD and 2.6 in TD. The thus-obtained biaxially stretched film showed a lay-flat width of 450 mm and a thickness of 90 μm.

Example 8

A biaxially stretched film was prepared in the same manner as in Example 1 except that Ny-1 in Example 1 was changed to Ny-3 (i.e., Ny-1+Ny-2 mixture to Ny-3+Ny-2 mixture). The thus-obtained biaxially stretched film showed a lay-flat width of 450 mm and a thickness of 90 μm.

Example 9

A biaxially stretched film was prepared in the same manner as in Example 1 except that PET in Example 1 was changed to LLDPE. The thus-obtained biaxially stretched film showed a lay-flat width of 450 mm and a thickness of 90 μm.

Example 10

A biaxially stretched film was prepared in the same manner as in Example 1 except that PET in Example 1 was changed to Ny-3. The thus-obtained biaxially stretched film showed a lay-flat width of 450 mm and a thickness of 90 μm.

Comparative Example 1

By using an apparatus identical to the one used in Example 1, a tubular laminate product (parison) having a laminar structure from the outer to the inner layers of PET(3)/mod-VL(3)/Ny-1+Ny-2=70+30 wt. %-mixture (26)/EVOH(7)/mod-VL(3)/VLDPE (48) with thickness ratios of respective layers indicated in the parentheses was co-extruded by extruding the respective resins through a plurality of extruders 1 respectively and introducing the melted resins to an annular die 2 to melt-bond the respective layers in the above-described order. The molten parison 3 extruded out of the die 2 was quenched to about 25° C. by a water bath 4 to form a flat tubular product 3a. Then, the flat tubular product 3a was passed through a warm water bath 6 at 88° C. and formed into a bubble-shaped tubular film 3c, which was then biaxially stretched at ratios of 2.6 times in a longitudinal direction (MD) and 2.9 times in a transverse direction (TD) by the inflation process while being cooled with cooling air at 20-25° C. from an air ring 9. Then, the biaxially stretched film 3d was guided into a 3 meter-long heat-treating tube 12 to form a bubble-shaped tubular film 3e, which was then heat-treated for about 7 sec. with steam at 85° C. blown out of steam blowing ports 13, while being allowed to relax (shrink) by 25% in MD direction and by 25% in TD direction, thereby providing a biaxially stretched film (heat-shrinkable multilayer film) 3f. The thus-obtained multilayer film exhibited a lay-flat width of 450 mm and a thickness of 90 μm.

Comparative Example 2

By using an apparatus identical to the one used in Example 1, a tubular laminate product (parison) having a laminar structure from the outer to the inner layers of PET(2)/mod-VL(1.5)/Ny-1+Ny-2=70+30 wt. %-mixture (14)/EVOH(4)/mod-VL(1.5)/VLDPE (17) with thickness ratios of respective layers indicated in the parentheses was co-extruded by extruding the respective resins through a plurality of extruders 1 (only one being shown) respectively and introducing the melted resins to an annular die 2 to melt-bond the respective layers in the above-described order. The molten parison 3 extruded out of the die 2 was quenched to about 25° C. by a water bath 4 to form a flat tubular product 3a. Then, the flat tubular product 3a was passed through a warm water bath 6 at 88° C. and formed into a bubble-shaped tubular film 3c, which was then biaxially stretched at ratios of 2.7 times in a longitudinal direction (MD) and 3.0 times in a transverse direction (TD) by the inflation process while being cooled with cooling air at 20-25° C. from an air ring 9. Then, the biaxially stretched film 3d was guided into a 3 meter-long heat-treating tube 12 to form a bubble-shaped tubular film 3e, which was then heat-treated for about 4.5 sec. with steam at 70° C. blown out of steam blowing ports 13, while being allowed to relax (shrink) by 10% in MD direction and by 10% in TD direction, thereby providing a biaxially stretched film (heat-shrinkable multilayer film) 3f. The thus-obtained multilayer film exhibited a lay-flat width of 450 mm and a thickness of 40 μm.

Comparative Example 3

A biaxially stretched film was prepared in the same manner as in Comparative Example 2 except that the laminar structure was changed to a laminar structure from the outer to the inner layers of PET(3)/mod-VL(3)/Ny-1+Ny-2=70+30 wt. %-mixture (30)/EVOH(7)/mod-VL(3)/VLDPE (44) with thickness ratios of respective layers indicated in the parentheses. The thus-obtained biaxially stretched film showed a lay-flat width of 450 mm and a thickness of 90 μm.

Comparative Example 4

A biaxially stretched film was prepared in the same manner as in Comparative Example 2 except that the laminar structure was changed to a laminar structure from the outer to the inner layers of PET(1.5)/mod-VL(1.5)/Ny-3 (8)/EVOH(5)/mod-VL(1.5)/LLDPE (21) with thickness ratios of respective layers indicated in the parentheses, and the stretching ratios were changed to 2.9 times in MD direction and 3.0 times in TD direction. The thus-obtained biaxially stretched film showed a lay-flat width of 450 mm and a thickness of 38.5 μm.

Comparative Example 5

The production of a biaxially stretched film was tried in the same manner as in Example 1 except for changing the mixing ratio of Ny-1+Ny-2 mixture to Ny-1+Ny-2=50+50 wt. %-mixture, whereby the breakage of the film occurred during the stretch film formation so that the winding-up of the film became impossible.

Comparative Example 6

A biaxially stretched film was prepared in the same manner as in Example 1 except for changing the mixing ratio of Ny-1+Ny-2 mixture to Ny-1+Ny-2=80+20 wt. %-mixture. The thus-obtained biaxially stretched film showed a lay-flat width of 450 mm and a thickness of 90 μm, whereas the film exhibited a thickness fluctuation of 40% or more, a poor wound state and also fluctuation of properties, thus lacking commodity value.

Comparative Example 7

A biaxially stretched film was prepared in the same manner as in Example 1 except that the mixing ratio of Ny-1+Ny-2 mixture to Ny-1+Ny-2=70+30 wt. %-mixture, and the laminar structure in Example 1 was changed to a laminar structure from the outer to the inner layers of PET(3)/mod-VL(3)/Ny-1+Ny-2=70+30 wt. %-mixture (22)/EVOH(7)/mod-VL(3)/VLDPE (52) with thickness ratios of respective layers indicated in the parentheses. The thus-obtained biaxially stretched film showed a lay-flat width of 450 mm and a thickness of 90 μm, whereas the film exhibited a thickness fluctuation of 40% or more, a poor wound state and also fluctuation of properties, thus lacking commodity value.

Comparative Example 8

A heat-shrinkable multilayer film was prepared according to the process of Example 10 of Patent document 1 which is believed to be the closest to the process of the present invention among the Examples in Patent document 1. More specifically, by using an apparatus having an arrangement as roughly shown in FIG. 1, a tubular laminate product (parison) having a laminar structure from the outer to the inner layers of PET (3)/mod-VL (3)/Ny-1+Ny-2=70+30 wt. %-mixture (23)/EVOH (4)/mod-VL (3)/VLDPE (54) with thickness ratios of respective layers indicated in the parentheses was co-extruded by extruding the respective resins through a plurality of extruders 1 (only one being shown) respectively and introducing the melted resins to an annular die 2 to melt-bond the respective layers in the above-described order. The molten parison 3 extruded out of the die 2 was quenched to about 16° C. by a water bath 4 to form a flat tubular product 3a. Then, the flat tubular product 3a was passed through a warm water bath 6 at 87° C. and formed into a bubble-shaped tubular film 3c, which was then biaxially stretched at ratios of 2.7 times in MD and 3.0 times in TD by the inflation process while being cooled with cooling air at 15-20° C. from an air ring 9. Then, the biaxially stretched film 3d was guided into a 2 meter-long heat-treating tube 12 to form a bubble-shaped tubular film 3e, which was then heat-treated for 7 sec. with steam at 87° C. blown out of steam blowing ports 13, while being allowed to relax by 20% in MD direction and by 20% in TD direction, thereby providing a heat-treated tubular film (heat-shrinkable multilayer film) 3f. The thus-obtained multilayer film exhibited a lay-flat width of 490 mm and a thickness of 90 μm.

Comparative Example 9

A heat-shrinkable multilayer film was prepared according to the process of Example 14 of Patent document 2 which is believed to be the closest to the process of the present invention among the Examples in Patent document 2. More specifically, by using an apparatus having an arrangement as roughly shown in FIG. 1, a tubular laminate product (parison) having a laminar structure from the outer to the inner layers of PET (3)/mod-VL (2)/NY-3 (16)/EVOH (8)/mod-VL (2)/LL-DPE (40) with thickness ratios of respective layers indicated in the parentheses was co-extruded by extruding the respective resins through a plurality of extruders 1 (only one being shown) respectively and introducing the melted resins to an annular die 2 to melt-bond the respective layers in the above-described order. The molten parison 3 extruded out of the die 2 was quenched to 10-18° C. by a water bath 4 to form a flat tubular product 3a. Then, the flat tubular product 3a was passed through a warm water bath 6 at 92° C. and formed into a bubble-shaped tubular film 3c, which was then biaxially stretched at ratios of 3.2 times in MD and 3.2 times in TD by the inflation process while being cooled with cooling air at 15-20° C. from an air ring 9. Then, the biaxially stretched film 3d was guided into a 2 meter-long heat-treating tube 12 to form a bubble-shaped tubular film 3e, which was then heat-treated for 7 sec. with steam at 90° C. blown out of steam blowing ports 13, while being allowed to relax by 30% in MD direction and by 32% in TD direction, thereby providing a biaxially stretched film (heat-shrinkable multilayer film) 3f. The thus-obtained multilayer film exhibited a lay-flat width of 490 mm and a thickness of 71 μm.

Comparative Example 10

A biaxially stretched film was prepared in the same manner as in Example 1 except for changing the stretching ratios to 2.0 times in MD direction and 2.0 times in TD direction. The thus-obtained biaxially stretched film showed a lay-flat width of 450 mm and a thickness of 90 μm, whereas the film exhibited a thickness fluctuation of 40% or more, a poor wound state and also fluctuation of properties, thus lacking commodity value.

The laminate structure, film production (stretching-relaxation) conditions, physical properties and deep drawing performances of the biaxially stretched multilayer films produced in the above-described Examples and Comparative Examples are inclusively shown in Tables 1 and 2 shown below.

TABLE 1

| | Examples | | | | |
| --- | --- | --- | --- | --- | --- |
| Example No. | 1 | 2 | 3 | 4 | 5 |
| Materials and structure of film | | | | | |
| 1st layer (thickness [μm]) | PET (3) | PET (3) | PET (3) | PET (6) | PET (7) |
| 2nd layer (thickness [μm]) | mod-VL (3) | mod-VL (3) | mod-VL (3) | mod-VL (3) | mod-VL (4) |
| 3rd layer (thickness [μm]) | Ny-1 + Ny-2 (30) = 60 + 40 wt % | Ny-1 + Ny-2 (30) = 65 + 35 wt % | Ny-1 + Ny-2 (30) = 70 + 30 wt % | Ny-1 + Ny-2 (39) = 60 + 40 wt % | Ny-1 + Ny-2 (48) = 60 + 40 wt % |

TABLE 1-continued

| | Examples | | | | |
|---|---|---|---|---|---|
| 4th layer (thickness [μm]) | EVOH (7) | EVOH (7) | EVOH (7) | EVOH (7) | EVOH (9) |
| 5th layer (thickness [μm]) | mod-VL (3) | mod-VL (3) | mod-VL (3) | mod-VL (3) | mod-VL (4) |
| 6th layer (thickness [μm]) | VLDPE (44) | VLDPE (44) | VLDPE (44) | VLDPE (72) | VLDPE (88) |
| Total thickness [μm] | 90 | 90 | 90 | 130 | 160 |
| Nylon layer thickness ratio [—] | 0.33 | 0.33 | 0.33 | 0.30 | 0.30 |
| Stretching temperature [° C.] | 86 | 86 | 86 | 88 | 88 |
| Stretching ratio MD/TD [—] | 2.2/2.4 | 2.2/2.4 | 2.4/2.4 | 2.2/2.4 | 2.2/2.4 |
| Film formability by stretching | A | A | A | A | A |
| Relaxation temperature [° C.] | 85 | 85 | 85 | 83 | 83 |
| Relaxation rate MD/TD [%] | 25/25 | 25/25 | 25/25 | 22/25 | 25/25 |
| Hot-water shrinkability at 90° C. | | | | | |
| MD/TD [%] | 12/12 | 11/11 | 12/12 | 17/18 | 13/15 |
| Tensile properties MD/TD | | | | | |
| Tensile stress at break [MPa] | 74.0/76.0 | 76.3/78.2 | 75.8/79.5 | 60.5/65.9 | 45.7/47.2 |
| Elongation at break [%] | 292/310 | 305/313 | 281/291 | 318/272 | 281/264 |
| High-temperature tensile properties after heating at 100° C. for 2 sec. | | | | | |
| Stress at 100%-elongation (MD/TD)[MPa] | 14.4/18.6 | 13.5/18.3 | 18.0/21.8 | 7.9/10.7 | 6.3/10.3 |
| Deep drawability | A | A | A | A | A |
| Mximum draw depth (D) [mm] | 105 | 100 | 95 | 105 | 105 |
| Area-basis maximum draw ratio [—] | 3.50 | 3.23 | 3.23 | 3.50 | 3.50 |
| Shorter side-basis draw ratio (D/L) | 0.84 | 0.80 | 0.76 | 0.84 | 0.84 |
| Heat-shrinkability after drawing | A | A | A | A | A |
| Example No. | 6 | 7 | 8 | 9 | 10 |
| Materials and structure of film | | | | | |
| 1st layer (thickness [μm]) | PET (7) | PET (3) | PET (3) | LLDPE (3) | Ny-3 (3) |
| 2nd layer (thickness [μm]) | mod-VL (4) | mod-VL (3) | mod-VL (3) | mod-VL (3) | mod-VL (3) |
| 3rd layer (thickness [μm]) | Ny-1 + Ny-2 (48) = 60 + 40 wt % | Ny-1 + Ny-2 (30) = 60 + 40 wt % | Ny-3 + Ny-2 (30) = 60 + 40 wt % | Ny-1 + Ny-2 (30) = 60 + 40 wt % | Ny-1 + Ny-2 (30) = 60 + 40 wt % |
| 4th layer (thickness [μm]) | EVOH (9) | EVOH (7) | EVOH (7) | EVOH (7) | EVOH (7) |
| 5th layer (thickness [μm]) | mod-VL (4) | mod-VL (3) | mod-VL (3) | mod-VL (3) | mod-VL (3) |
| 6th layer (thickness [μm]) | LLDPE (88) | VLDPE (44) | VLDPE (44) | VLDPE (44) | VLDPE (44) |
| Total thickness [μm] | 160 | 90 | 90 | 90 | 90 |
| Nylon layer thickness ratio [—] | 0.30 | 0.33 | 0.33 | 0.33 | 0.33 |
| Stretching temperature [° C.] | 90 | 86 | 86 | 86 | 86 |
| Stretching ratio MD/TD [—] | 2.2/2.4 | 2.4/2.6 | 2.2/2.4 | 2.2/2.4 | 2.2/2.4 |
| Film formability by stretching | A | A | A | A | A |
| Relaxation temperature [° C.] | 80 | 85 | 85 | 85 | 85 |
| Relaxation rate MD/TD [%] | 25/25 | 25/25 | 25/25 | 25/25 | 25/25 |
| Hot-water shrinkability at 90° C. | | | | | |
| MD/TD [%] | 11/14 | 12/13 | 14/15 | 11/13 | 11/12 |
| Tensile properties MD/TD | | | | | |
| Tensile stress at break [MPa] | 65.5/54.6 | 72.2/79.1 | 71.0/73.2 | 69.0/71.4 | 72.5/74.0 |
| Elongation at break [%] | 407/316 | 269/217 | 303/321 | 298/318 | 288/312 |
| High-temperature tensile properties after heating at 100° C. for 2 sec. | | | | | |
| Stress at 100%-elongation (MD/TD)[MPa] | 8.7/10.8 | 15.6/21.5 | 13.4/16.6 | 13.4/17.6 | 14.0/18.4 |
| Deep drawability | A | A | A | A | A |
| Mximum draw depth (D) [mm] | 105 | 100 | 105 | 105 | 105 |
| Area-basis maximum draw ratio [—] | 3.50 | 3.36 | 3.50 | 3.50 | 3.50 |
| Shorter side-basis draw ratio (D/L) | 0.84 | 0.80 | 0.84 | 0.84 | 0.84 |
| Heat-shrinkability after drawing | A | A | A | A | A |

TABLE 2

| | Comparative Examples | | | | |
|---|---|---|---|---|---|
| Example No. | Comparative 1 | Comparative 2 | Comparative 3 | Comparative 4 | Comparative 5 |
| Materials and structure of film | | | | | |
| 1st layer (thickness [μm]) | PET (3) | PET (2) | PET (3) | PET (1.5) | PET (3) |
| 2nd layer (thickness [μm]) | mod-VL (3) | mod-VL (1.5) | mod-VL (3) | mod-VL (1.5) | mod-VL (3) |
| 3rd layer (thickness [μm]) | Ny-1 + Ny-2 (26) = 70 + 30 wt % | Ny-1 + Ny-2 (14) = 70 + 30 wt % | Ny-1 + Ny-2 (30) = 70 + 30 wt % | Ny-3 (8) | Ny-1 + Ny-2 (30) = 50 + 50 wt % |

TABLE 2-continued

| | Comparative Examples | | | | |
|---|---|---|---|---|---|
| 4th layer (thickness [μm]) | EVOH (7) | EVOH (4) | EVOH (7) | EVOH (5) | EVOH (7) |
| 5th layer (thickness [μm]) | mod-VL (3) | mod-VL (1.5) | mod-VL (3) | mod-VL (1.5) | mod-VL (3) |
| 6th layer (thickness [μm]) | VLDPE (48) | VLDPE (17) | VLDPE (44) | LLDPE (21) | VLDPE (44) |
| Total thickness [μm] | 90 | 40 | 90 | 38.5 | 90 |
| Nylon layer thickness ratio [—] | 0.29 | 0.35 | 0.35 | 0.21 | 0.33 |
| Stretching temperature [° C.] | 88 | 88 | 88 | 88 | 86 |
| Stretching ratio MD/TD [—] | 2.6/2.9 | 2.7/3.0 | 2.7/3.0 | 2.9/3.0 | 2.2/2.4 |
| Film formability by stretching | A | A | A | A | C |
| Relaxation temperature [° C.] | 85 | 70 | 70 | 70 | 85 |
| Relaxation rate MD/TD [%] | 25/25 | 10/10 | 10/10 | 10/10 | 25/25 |
| Hot-water shrinkabilty at 90° C. | | | | | |
| MD/TD [%] | 11/11 | 35/40 | 33/38 | 28/32 | —/— |
| Tensile properties MD/TD | | | | | |
| Tensile stress at break [MPa] | 83.5/83.0 | 150/135 | 141/128 | 88/83 | |
| Elongation at break [%] | 231/194 | 173/132 | 168/135 | 138/110 | |
| High-temperature tensile properties after heating at 100° C. for 2 sec. | | | | | |
| Stress at 100%-elongation (MD/TD)[MPa] | 22.8/31.6 | 71.6/96.9 | 68.8/88.9 | 63.3/73.4 | —/— |
| Deep drawability | B | C | C | C | — |
| Mximum draw depth (D) [mm] | 75 | — | — | — | — |
| Area-basis maximum draw ratio [—] | 2.68 | — | — | — | — |
| Shorter side-basis draw ratio (D/L) | 0.61 | — | — | — | — |
| Heat-shrinkability after drawing | A | — | — | — | — |

| Example No. | Comparative 6 | Comparative 7 | Comparative 8 | Comparative 9 | Comparative 10 |
|---|---|---|---|---|---|
| Materials and structure of film | | | | | |
| 1st layer (thickness [μm]) | PET (3) | PET (3) | PET (3) | PET (3) | PET (3) |
| 2nd layer (thickness [μm]) | mod-VL (3) | mod-VL (3) | mod-VL (3) | mod-VL (2) | mod-VL (3) |
| 3rd layer (thickness [μm]) | Ny-1 + Ny-2 (30) = 80 + 20 wt % | Ny-1 + Ny-2 (22) = 70 + 30 wt % | Ny-1 + Ny-2 (23) = 70 + 30 wt % | Ny-3 (16) | Ny-1 + Ny-2 (30) = 60 + 40 wt % |
| 4th layer (thickness [μm]) | EVOH (7) | EVOH (7) | EVOH (4) | EVOH (8) | EVOH (7) |
| 5th layer (thickness [μm]) | mod-VL (3) | mod-VL (3) | mod-VL (3) | mod-VL (2) | mod-VL (3) |
| 6th layer (thickness [μm]) | VLDPE (44) | VLDPE (52) | VLDPE (54) | LLDPE (40) | VLDPE (44) |
| Total thickness [μm] | 90 | 90 | 90 | 71 | 90 |
| Nylon layer thickness ratio [—] | 0.33 | 0.24 | 0.26 | 0.23 | 0.33 |
| Stretching temperature [° C.] | 86 | 86 | 87 | 92 | 86 |
| Stretching ratio MD/TD [—] | 2.2/2.4 | 2.2/2.4 | 2.7/3.0 | 3.2/3.2 | 2.0/2.0 |
| Film formability by stretching | B | B | A | A | B |
| Relaxation temperature [° C.] | 85 | 85 | 87 | 95 | 85 |
| Relaxation rate MD/TD [%] | 25/25 | 25/25 | 20/20 | 30/32 | 25/25 |
| Hot-water shrinkabilty at 90° C. | | | | | |
| MD/TD [%] | —/— | —/— | 9/12 | 3/5 | —/— |
| Tensile properties MD/TD | | | | | |
| Tensile stress at break [MPa] | | | 88.0/86.2 | 104/98 | |
| Elongation at break [%] | | | 220/173 | 226/225 | |
| High-temperature tensile properties after heating at 100° C. for 2 sec. | | | | | |
| Stress at 100%-elongation (MD/TD)[MPa] | —/— | —/— | 24.7/33.7 | 29.5/29.8 | —/— |
| Deep drawability | — | — | B | B | — |
| Mximum draw depth (D) [mm] | — | — | 70 | 70 | — |
| Area-basis maximum draw ratio [—] | — | — | 2.54 | 2.54 | — |
| Shorter side-basis draw ratio (D/L) | — | — | 0.56 | 0.56 | — |
| Heat-shrinkability after drawing | — | — | A | A | — |

INDUSTRIAL APPLICABILITY

As is clear from the results shown in Tables 1 and 2 above, according to the process of the present invention wherein a tubular laminate (parison) including an intermediate layer comprising a polyamide resin of an extremely restricted composition is subjected to an inflation process including biaxial-stretching and relaxation characterized by extremely limited stretching ratios and relaxation ratios, there is provided a polyamide resin-based heat-shrinkable multilayer film for deep drawing provided with a high degree of deep drawability represented by remarkable increases in maximum draw depth, area-basis maximum draw ratio and shorter side-basis draw ratio, compared with the conventional products.

The invention claimed is:

1. A heat-shrinkable multilayer film adapted for deep draw forming, comprising: a surface layer (a) comprising a thermoplastic resin, an intermediate layer (b) comprising a polyamide resin, and a surface layer (c) comprising a sealable resin, wherein, (A) the intermediate layer (b) comprises a mixture of an aliphatic polyamide having a melting point of at least 180° C., and an amorphous aromatic polyamide comprising a polycondensation product of an aliphatic diamine with isophthalic acid and terephthalic acid as main acid components, including 25-45 wt. % of the amorphous aromatic polyamide, and has a thickness exceeding 25% and at most 50% of a total thickness of whole layers, and the multilayer film exhibits: (B) tensile stresses at an elongation of 100% as measured in a tensile test at 100° C., including 3-22 MPa in at least one of a longitudinal direction (MD) and a transverse direction (TD) and an average of MD and TD values of 3-20 MPa, and (C) a shrinkage in hot water at 90° C. of 3 to 20% in each of MD and TD.

2. A heat-shrinkable multilayer film according to claim 1, exhibiting a maximum draw depth (D) of at least 60 mm, and a shorter side-basis draw ratio (D/L) as determined by a ratio of the maximum draw depth (D)/a mold shorter side length (L) of at least 0.70.

3. A heat-shrinkable multilayer film according to claim 1, exhibiting an area-basis maximum draw ratio of at least 2.8 as determined by a maximum of ratio of a mold inner surface area/a mold opening area given by molds which allow deep drawing.

4. A heat-shrinkable multilayer film according to claim 1, wherein the amorphous aromatic polyamide forming the intermediate layer (b) comprises a polycondensation product of hexamethylenediamine with isophthalic acid and terephthalic acid as main acid components.

5. A heat-shrinkable multilayer film according to claim 1, wherein the aliphatic polyamide forming the intermediate layer (b) comprises nylon 6 or nylon 6-66 copolymer.

6. A heat-shrinkable multilayer film according to claim 1, wherein the thermoplastic resin forming the surface layer (a) comprises polyester, polyolefin, or nylon.

7. A heat-shrinkable multilayer film according to claim 1, wherein the sealable resin forming the surface layer (c) comprises polyolefin.

8. A heat-shrinkable multilayer film according to claim 1, including at least one of a gas barrier resin layer and an adhesive resin layer as an additional intermediate layer between the intermediate layer (b) and the surface layer (a) and/or (c).

9. A process for producing a heat-shrinkable multilayer film according to claim 1, comprising:
co-extruding at least three species of melted thermoplastic resins to form a tubular product comprising at least three layers including a surface layer (a) comprising a thermoplastic resin, an intermediate layer (b) comprising a polyamide resin, and a surface layer (c) comprising a sealable resin; wherein the intermediate layer (b) comprises a mixture of an aliphatic polyamide having a melting point of at least 180° C., and an amorphous aromatic polyamide comprising a polycondensation product of an aliphatic diamine with isophthalic acid and terephthalic acid as main acid components, including 25-45 wt. % of the amorphous aromatic polyamide, and has a thickness exceeding 25% and at most 50% of a total thickness of whole layers;

cooling with water the tubular product to a temperature below a lowest one of the melting points of thermoplastic resins principally forming the respective layers, re-heating the tubular product to a temperature which is at most the lowest one of the melting points of thermoplastic resins principally forming the respective layers, vertically pulling the tubular product while introducing a fluid into the tubular product to stretch the tubular product 2.1-2.4 times in the vertical direction and 2.1-2.6 times in the circumferential direction to form a biaxially stretched tubular film, folding the tubular film, again introducing a fluid into the folded tubular film to form a tubular film, heat-treating the tubular film from its surface layer (a) side with steam or warm water to provide a relaxation ratio of 20-35% in each of the vertical direction and the circumferential direction, and cooling the heat-treated tubular film to obtain a stretch-oriented multilayer film.

10. A process for producing a heat-shrinkable multilayer film according to claim 9, wherein the tubular product is stretched 2.2-2.4 times in the vertical direction and 2.2-2.6 times in the circumferential direction while being pulled in the vertical direction and then heat-relaxed at a rate of 20-30% in each direction to form a biaxially stretched tubular film.

11. A process for producing a heat-shrinkable multilayer film according to claim 9, wherein the heat-relaxation is performed by contact with steam or water at 75-95° C.

12. A heat-shrinkable multiplayer film according to claim 1, wherein the multilayer film exhibits: tensile stresses at an elongation of 100% as measured in a tensile at 100° C., including 6.3-21.8 MPa in at least one of a longitudinal direction (MD) and a transverse direction (TD) and an average of MD and TD values of 8.3-19.9 MPa.

* * * * *